(12) United States Patent
Bordin

(10) Patent No.: US 10,829,930 B2
(45) Date of Patent: Nov. 10, 2020

(54) WATERPROOF PANEL FOR SHOWER TRAY

(71) Applicant: PROGRESS PROFILES SPA, Asolo (IT)

(72) Inventor: Dennis Bordin, Asolo (IT)

(73) Assignee: PROGRESS PROFILES SPA, Asolo (IT)

( * ) Notice: Subject to any disclaimer, the term of this patent is extended or adjusted under 35 U.S.C. 154(b) by 20 days.

(21) Appl. No.: 16/241,729

(22) Filed: Jan. 7, 2019

(65) Prior Publication Data

US 2019/0218768 A1 Jul. 18, 2019

(30) Foreign Application Priority Data

Jan. 16, 2018 (IT) ........................ 102018000001008

(51) Int. Cl.
| | |
|---|---|
| *A47K 3/40* | (2006.01) |
| *E04B 1/66* | (2006.01) |
| *E04F 15/10* | (2006.01) |
| *E04F 15/18* | (2006.01) |
| *E04F 15/02* | (2006.01) |
| *B32B 3/06* | (2006.01) |
| *B32B 3/30* | (2006.01) |
| *A47K 3/16* | (2006.01) |

(52) U.S. Cl.
CPC ............ *E04B 1/665* (2013.01); *A47K 3/40* (2013.01); *B32B 3/06* (2013.01); *B32B 3/30* (2013.01); *E04F 15/02188* (2013.01); *E04F 15/105* (2013.01); *E04F 15/107* (2013.01); *E04F 15/18* (2013.01); *E04F 15/182* (2013.01); *E04F 15/185* (2013.01); *A47K 3/16* (2013.01); *A47K 3/405* (2013.01); *B32B 2307/7265* (2013.01); *E04F 2203/08* (2013.01)

(58) Field of Classification Search
CPC .. E04B 1/665; B32B 3/06; B32B 3/30; A47K 3/40; E04F 15/02188
USPC ............................................................ 4/613
See application file for complete search history.

(56) References Cited

U.S. PATENT DOCUMENTS

| | | | | |
|---|---|---|---|---|
| 5,140,789 | A | * | 8/1992 | De Gooyer .............. A47K 3/40 4/613 |
| 6,161,353 | A | * | 12/2000 | Negola .................... E04C 2/205 428/167 |
| 2014/0317841 | A1 | * | 10/2014 | DeJesus .................... A47K 3/40 4/613 |
| 2015/0096249 | A1 | * | 4/2015 | Amend .................... B05D 1/02 52/309.13 |

FOREIGN PATENT DOCUMENTS

EP    1038661 A1    9/2000

OTHER PUBLICATIONS

IT Search Report dated May 7, 2018 re: Application No. IT 2018000001008, pp. 1-6, citing: EP 1 038 661 A1.

* cited by examiner

*Primary Examiner* — Huyen D Le
(74) *Attorney, Agent, or Firm* — Cantor Colburn LLP

(57) ABSTRACT

A waterproof panel for shower tray, adapted to be placed over a foundation, to be interposed between the latter and a floor covering layer includes at least one plate-like element and a waterproof covering which is applied on top of the at least one plate-like element, and has, on the lower face for adhesion to the foundation, and low-relief portions adapted to accommodate adhesive for the adhesion of the panel to the foundation.

6 Claims, 2 Drawing Sheets

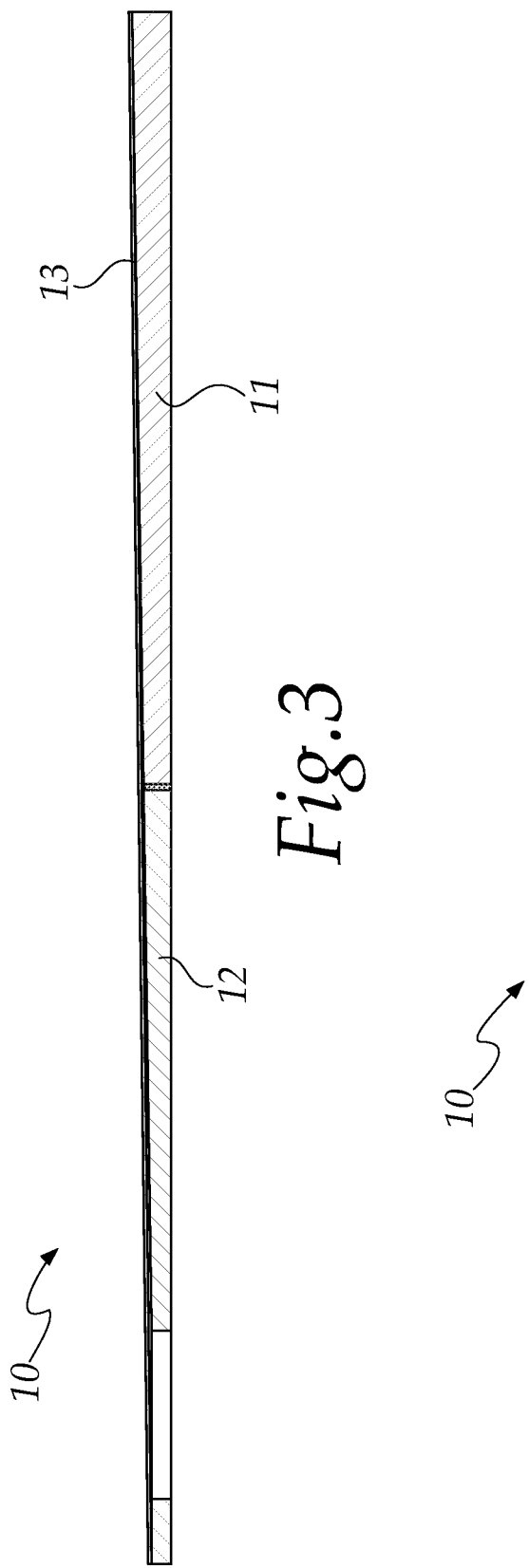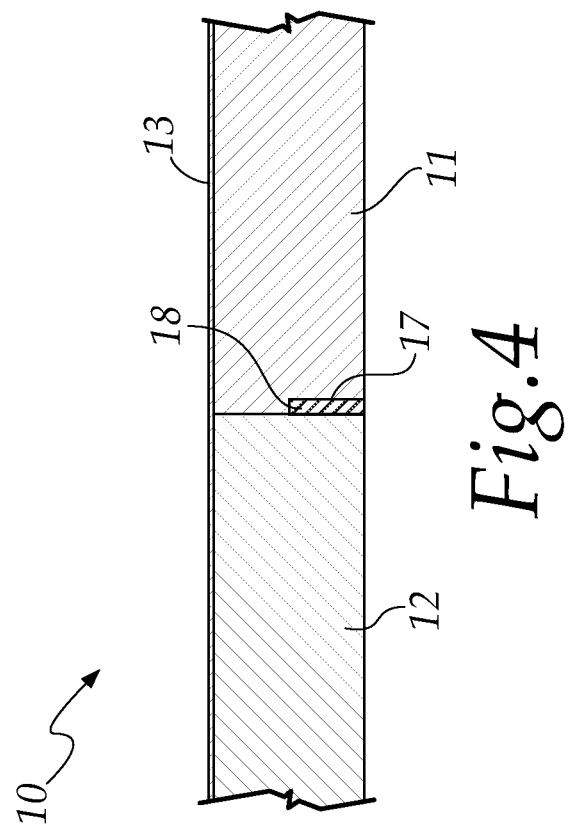

WATERPROOF PANEL FOR SHOWER TRAY

CROSS REFERENCE TO RELATED APPLICATIONS

This application is related to, and claims the benefit of, Italian Patent Application No. 102018000001008, filed on Jan. 16, 2018, the contents of which are herein incorporated by reference in their entirety.

TECHNICAL FIELD

The present disclosure relates to a waterproof panel for shower trays.

BACKGROUND

Currently, in order to make waterproof the base of the shower, a waterproof panel is used which is to be applied on the foundation or floor slab and onto which the finishing tiles are to be applied.

The waterproof panel is typically made of polystyrene, conveniently has a slope in order to convey the water toward an adapted drain, and is made waterproof in an upper region by means of a polyethylene membrane.

This panel is often sold in two polystyrene plates held together by the upper membrane, which allows to close the panel in a clamshell fashion in order to facilitate its transport.

Typically, the panels are obtained from polystyrene blocks which are cut according to the desired dimension and thickness.

Although these panels are currently very widespread, they are not free from drawbacks, in particular in ensuring total waterproofing of the base of the shower enclosure.

Imperfect adhesion of the panel to the foundation or floor slab can in fact cause water infiltrations which create unpleasant situations of humidity in the shower box.

Furthermore, the voids caused by imperfect adhesion may be audible by stepping on the base of the shower enclosure.

Moreover, the separation of the panel into two plates can facilitate the spread of water that has infiltrated below said panel.

SUMMARY

The aim of the present disclosure is to provide a waterproof panel for shower trays that is capable of improving the background art in one or more of the aspects indicated above.

Within this aim, the disclosure provides a waterproof panel for shower trays that prevents water infiltrations between said panel and the base to which it must be applied.

The disclosure also provides a panel for shower trays that can be closed in a clamshell fashion and prevents the passage of water between the two plates that compose it.

The disclosure further provides a panel that is highly reliable, relatively simple to provide and at competitive costs.

This aim, as well as these and other advantages which will become better apparent hereinafter, are achieved by providing a waterproof panel for shower tray, adapted to be placed over a foundation, to be interposed between the latter and a floor covering layer, said panel comprising at least one plate-like element and a waterproof covering which is applied on top of said at least one plate-like element, characterized in that it has, on the lower face for adhesion to the foundation, low-relief portions adapted to accommodate adhesive for the adhesion of said panel to said foundation.

BRIEF DESCRIPTION OF THE DRAWINGS

Further characteristics and advantages of the disclosure will become better apparent from the description of a preferred but not exclusive embodiment of the panel according to the disclosure, illustrated by way of non-limiting example in the accompanying drawings, wherein:

FIG. 3 is a sectional side view of the panel according to the disclosure; and

FIG. 4 is an enlarged-scale side view of the panel according to the disclosure.

DETAILED DESCRIPTION OF THE DRAWINGS

Figure 1:
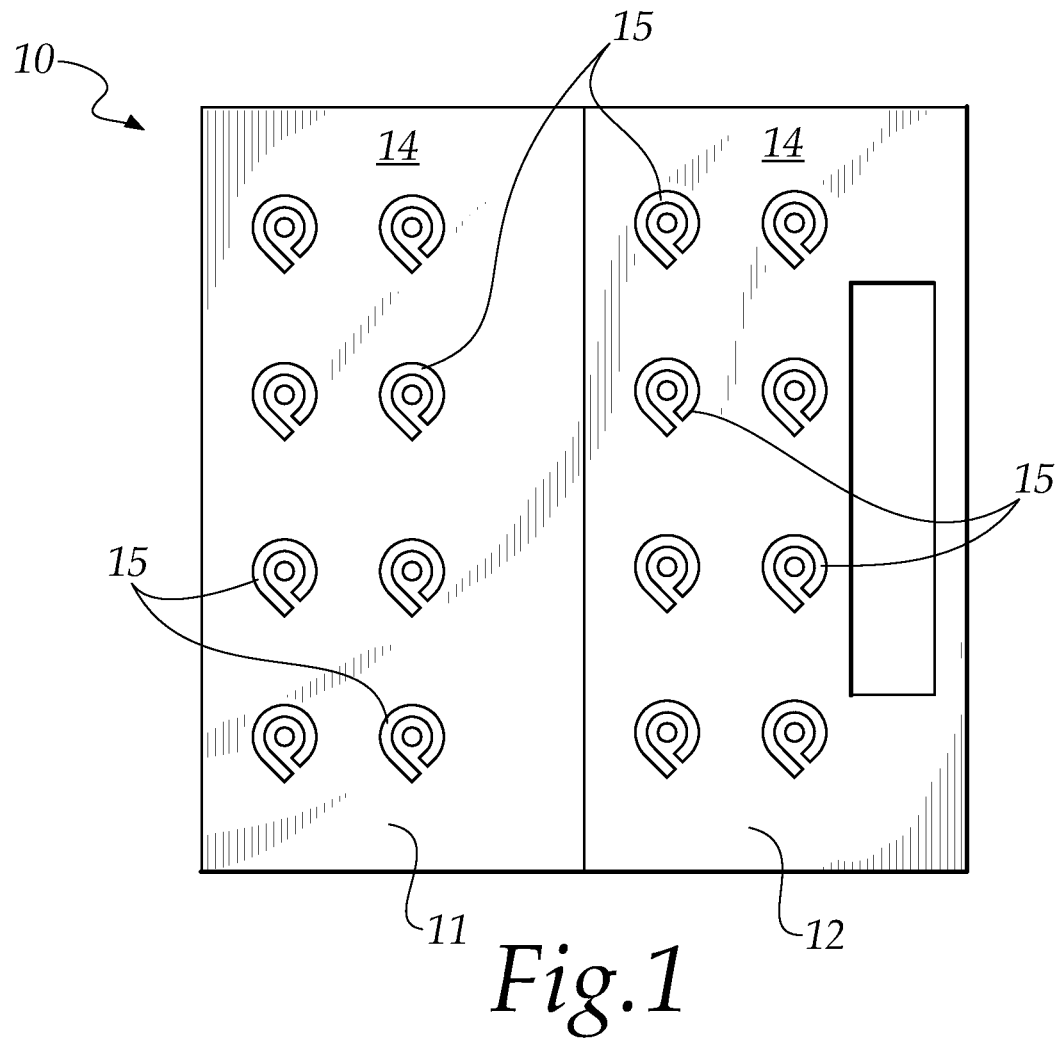
FIG. 1 is a base plan view of the panel according to the disclosure.

With reference to the FIGS. 1-4, the waterproof panel for shower trays, according to the disclosure, designated generally by the reference numeral 10, is adapted to be placed over a foundation or floor slab, so as to be, at the end of the installation of the base of the shower, interposed between the foundation and a floor covering layer, for example a layer of tiles.

The panel 10 comprises at least one plate-like element 11, 12 and a waterproof covering 13 which is applied over the at least one plate-like element 11, 12 and has, on the lower face 14 for adhesion to the foundation, low-relief portions 15 adapted to accommodate adhesive for the adhesion of the panel 10 to the foundation.

The plate-like elements of the panel are advantageously provided by molding plastic material, preferably EPS (Sintered Expanded Polystyrene) with a density comprised between 45 and 55 kg/m$^3$, and the waterproof top covering 13 comprises a polyethylene membrane with three layers which is thermally bonded to the plate-like elements.

The cross-section of the panel 10 has, in a per se known manner, a variable thickness, preferably from 1 cm to 3 cm. With a panel having plan dimensions of 120 cm width and 120 cm length, this cross-section returns a constant inclination of 1.5%-2% and allows a correct provision of the slopes of the shower tray. The thickness can also vary from 1 cm to 5 cm. The standard panel is square with a side of 120 cm, but it can also have smaller or larger dimensions and a different shape, for example rectangular. If the panel is smaller than the standard dimensions, it can be cut, otherwise it is possible to add extensions.

Figure 2:
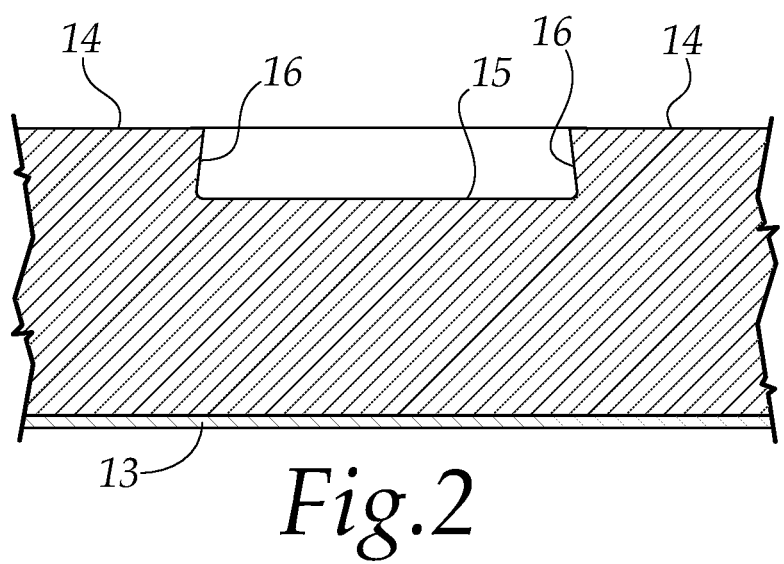
FIG. 2 is an enlarged-scale sectional view of a detail of the panel according to the disclosure.

The low-relief portions 15 are shown in the plan view of FIG. 1 and FIG. 2 is an enlarged-scale sectional view of a part of a low-relief portion 15.

As is evident, the low-relief portions 15 have an undercut cross-section, preferably a dovetail cross-section, in order to retain the adhesive that is deposited in them following the laying of the panel on the foundation or floor slab on which a layer of adhesive is applied.

The side walls 16 of the low-relief portion preferably have an internal inclination of 6°, with a relative slope of 10%, and a depth of approximately 4-5 mm.

The low-relief portions 15 shown in FIG. 1 have a plan design that reproduces substantially the perimeter of a drop, with a circular portion at the center which is also in low-relief.

However, this shape is nonbinding and can be replaced conveniently by any other geometric shape in low-relief on the lower surface of the panel 10.

As shown in FIGS. 1, 3 and 4, the panel 10 comprises two of such plate-like elements 11 and 12 arranged side by side and joined by the waterproof covering 13, which substantially allows a closure in a clamshell fashion of the panel 10, superimposing the two elements during its transport.

At least one of the two plate-like elements 11 has, on the side that faces the other plate-like element 12, a recess 17 for the accommodation of an adhesive 18. The recess 17 and the adhesive 18 are shown in the enlarged-scale view of FIG. 4.

The recess 17 is extended along the entire side of the plate-like element 11 and can have for example a thickness of 2 mm and a height of 1 cm.

The adhesive 18 preferably comprises a strip of double adhesive, for example of the butyl type, which is applied in the recess 17 along its entire length.

The panel 10 is conveniently supplied to the buyer folded in a clamshell fashion and with a strip of double adhesive applied beforehand to the plate-like element 11 that is provided with the recess 17.

The use of the panel according to the disclosure is as follows.

The protection that is provided on the strip of double adhesive is removed and the panel is opened, making the two plate-like elements 11 and 12 adhere on the side.

The operator applies the adhesive on the foundation or floor slab and places the panel 10 thereon. The panel is pressed against the foundation, facilitating uniform distribution of the adhesive and the entry thereof in the low-relief portions 15.

The entry of the adhesive in the low-relief portions facilitates the uniform distribution of the adhesive, limiting the presence of regions of accumulation of adhesive and of voids between the panel and the foundation.

The curing of the adhesive ensures the adhesion of the panel 10 to the foundation and at the same time the undercut low-relief portions 15 prevent the separation of the cured adhesive from the lower surface of the panel.

Substantially, the inclination of the side walls of the low-relief portions 15 facilitates the mechanical anchoring of the adhesive.

The grip of the panel 10 to the foundation is thus improved considerably thereby, consequently increasing the level of waterproofing of the base of the shower.

Furthermore, the presence of the adhesive between the two plate-like elements prevents, in case of breakage of the covering layer, any infiltrations of water from being able to reach the foundation through the interface region between the two elements. The function of the strip is in fact not only to make the two plate-like elements adhere but also to reduce their movements and to waterproof the joining region.

In practice it has been found that the disclosure achieves the intended aim and objects, providing a waterproof panel for shower trays that is capable of preventing infiltrations of water between said panel and the base to which it is applied.

The disclosure thus conceived is susceptible of numerous modifications and variations, all of which are within the scope of the appended claims; all the details may furthermore be replaced with other technically equivalent elements.

In practice, the materials used, so long as they are compatible with the specific use, as well as the contingent shapes and dimensions, may be any according to the requirements and the state of the art.

What is claimed is:

1. A waterproof panel for a shower tray, adapted to be placed over a foundation, to be interposed between the latter and a floor covering layer, said panel comprising at least one plate-like element and a waterproof covering which is applied on top of said at least one plate-like element, having, on a lower face for adhesion to the foundation, a plurality of low-relief portions adapted to accommodate adhesive for the adhesion of said panel to said foundation, further comprising two of said plate-like elements arranged side by side and joined by said waterproof covering, at least one of said two plate-like elements having, on a side that faces the other one of said plate-like elements, a recess for the accommodation of an adhesive.

2. The panel according to claim 1, wherein said low-relief portions have an undercut cross-section.

3. The panel according to claim 1, wherein said low-relief portions have a dovetail cross-section.

4. The panel according to claim 1, wherein said recess is extended along the entire side of said plate-like element.

5. The panel according to claim 1, wherein said adhesive comprises a strip of double adhesive.

6. The panel according to claim 1, wherein said at least one plate-like element is provided by molding plastic material.

* * * * *